United States Patent [19]
Piety et al.

[11] Patent Number: 5,263,261
[45] Date of Patent: Nov. 23, 1993

[54] SHAFT ALIGNMENT DATA ACQUISITION

[75] Inventors: Kenneth R. Piety; Daniel L. Nower, both of Knoxville, Tenn.

[73] Assignee: Computational Systems, Incorporated, Knoxville, Tenn.

[21] Appl. No.: 892,587

[22] Filed: Jun. 3, 1992

[51] Int. Cl.$^5$ .......................... G01B 5/25; G01B 7/31; G06F 15/46

[52] U.S. Cl. ...................... 33/645; 33/412; 33/661; 364/561

[58] Field of Search ............... 33/645, 412, 533, 661, 33/228; 364/561, 710.02

[56] References Cited

U.S. PATENT DOCUMENTS

| | | | |
|---|---|---|---|
| 4,148,013 | 4/1979 | Finn et al. | 33/655 |
| 4,367,594 | 1/1983 | Murray, Jr. | 33/661 |
| 4,428,126 | 1/1984 | Banks | 33/645 |
| 4,463,438 | 7/1984 | Zatezalo et al. | 364/561 |
| 4,516,328 | 5/1985 | Massey | 33/645 |
| 4,553,335 | 11/1985 | Woyton | 33/645 |
| 4,586,264 | 5/1986 | Zatezalo | 33/645 |
| 4,709,485 | 12/1987 | Bowman | 33/228 |
| 4,964,224 | 10/1990 | Jackson | 33/645 |
| 5,026,998 | 6/1991 | Hölzl | 356/152 |
| 5,056,237 | 10/1991 | Saunders | 33/645 |
| 5,077,905 | 1/1992 | Murray, Jr. | 33/645 |

OTHER PUBLICATIONS

*Shaft Alignment Handbook*, J. Piotrowski, 1986, pp. 101–103.
*Alignment Manual for Horizontal, Flexibly Coupled Rotating Machines*, 3rd Edition, M. Murray, Jr. 1983 p. 31.
*Total Alignment*, V. R. Dodd, 1974, pp. 1–5, II-6, II-7.
"Coupling Alignment: The Reverse Indicator Method Simplified", Bolam, *P/PM Technology*, Jul./Aug. 1990, pp. 16–23.
"Aligning Shafts-Part 1, Measuring Misalignment", Durkin, *Plant Engineering*, Jan. 11, 1979, pp. 86–90.
"Aligning Shafts-Part 2, Correcting Misalignment", Durkin, Plant Engineering, Feb. 8, 1979, pp. 102–105.

*Primary Examiner*—William A. Cuchlinski, Jr.
*Assistant Examiner*—C. W. Fulton
*Attorney, Agent, or Firm*—Luedeka, Hodges, Neely & Graham

[57] ABSTRACT

Methods and systems for acquiring offset data for aligning co-rotatable in-line machine shafts. Two sets of offset data, each set for example representing relative displacement in a radial direction between a reference point referenced to one of the shafts and a particular point on the other of the shafts at given angular positions, are collected at a plurality of measurement angular positions. The measurement angular positions are not necessarily the 0°, 90°, 180° and 270° angular positions at which measurements are traditionally taken. Preferably, measured offset data is collected during continuous rotation of the shafts in their normal direction of rotation or at convenient positions where the rotation is halted. Measured offset data may be collected at as few as three angular positions, but preferably is collected at more than three angular positions, and typically at a multiplicity of angular positions such as thirty or forty. A respective sine function is fit to each set of measured offset data. Data for the traditional 0°, 90°, 180° and 270° angular positions are then determined from the sine function. This data is thus determined in an indirect predictive manner, and is used in subsequent calculations to determine machine moves as though the calculation data had been determined by direct measurement at the 0°, 90°, 180° and 270° angular positions.

18 Claims, 4 Drawing Sheets

ANGULARITY

Fig.3

OFFSET

SHAFT ALIGNMENT DATA ACQUISITION

BACKGROUND OF THE INVENTION

The present invention relates generally to the art of aligning co-rotatable in-line machine shafts which are coupled together for operation by means of a shaft coupling. More particularly, the invention relates to methods and systems for acquisition of data from which the amount of misalignment can be determined, and from which machine moves to bring the shafts into alignment can be determined.

As is well known, whenever two rotating machine shafts are coupled together, such as the shaft of an electric motor and the shaft of a pump, it is important that the shafts be aligned within predetermined tolerances. Such shafts, when in perfect alignment, have their extended center lines (axes of rotation) coinciding along a straight line. Misalignment can lead to vibration, excessive wear, and ultimate destruction of couplings, bearings, seals, gears and other components.

There are two relevant misalignment components, and either or both may be present in a given situation. One misalignment component is offset misalignment, also termed parallel misalignment or simply offset. In the case of offset misalignment, shaft center lines may be parallel, but they do not intersect. The other misalignment component is angular misalignment, and occurs when shafts intersect at an angle. Angular misalignment is also termed angularity, and is manifested as a difference in distance between coupling hub faces across a diameter of the coupling hub faces.

A number of shaft alignment methods are known, which generally have in common the use of suitable alignment fixtures, also termed alignment brackets. The alignment brackets are employed to measure particular relative displacements (also termed offsets) as the shafts are rotated together through one revolution, while stopping at 0°, 90°, 180° and 270° angular rotation positions to take readings. Each relative displacement is measured between a point referenced to one of the shafts by means of the alignment bracket and a point on the other shaft. Dial indicators are often employed, these dial indicators having a plunger which moves a hand on the face of the dial indicator.

The readings are then used to calculate machine moves which will bring the shafts into alignment. The 0°, 90°, 180° and 270° angular positions at which readings are conventionally taken lie in geometric planes in which either of the machines, for example the motor, may be moved for purposes of alignment. In particular, the mounting bolts of the machine may be loosened and the machine may be either moved in a horizontal plane; or the machine may be moved in a vertical plane by placing or removing shims under one or more of the feet of the machine, or both. There are well developed calculation methods and procedures known in the art for determining what machine moves to make to achieve an aligned condition based on measurement of relative displacement (offset) data at the 0°, 90°, 180° and 270° positions mentioned, which may be termed calculation angular positions.

Although mechanical dial indicators are referred to above, it will be appreciated that other forms of measurement devices may be employed, including various optical and mechanical transducers. Also, although it is relative displacement which is actually determined, it will further be appreciated that absolute readings may be taken, referenced to a particular angular position, and a simple subtraction operation performed to determine relative displacement.

There are various points where relative displacements may be measured, depending upon the particular alignment geometry employed. However, a commonly employed method is the reverse indicator method wherein a pair of relative displacements in a radial direction are measured at each of the calculation angular positions.

As usually practiced, the reverse indicator method employs either one or two alignment brackets. An alignment bracket has a base firmly clamped or otherwise affixed to one shaft, and an extension bar or arm extends laterally from the base in a direction generally parallel to the shafts across the coupling over to a reference point adjacent a point on the periphery of the other shaft. A device for measuring displacement, such as a dial indicator, is positioned so as to measure relative displacement in a radial direction (offset) from the reference point to the point on the periphery of the other shaft as the shafts are rotated together while stopping at the 0°, 90°, 180° and 270° angular positions to take and record readings. The position of the alignment bracket is then reversed so as to be fixedly referenced to the other shaft, establishing a reference point adjacent a point on the periphery of the one shaft, and the procedure is repeated. Alternatively, a pair of alignment brackets may be employed for simultaneous readings.

From the geometry just described, it will be appreciated that the reference point on the alignment bracket attached to the one shaft rotates about the projected centerline (axis of rotation) of the one shaft to define a circle centered on that projected centerline, and vice versa for the other shaft, and that the distance and direction of the distance between the two shaft centerlines as projected can be determined at any transverse plane along the shaft axes. From the thus measured distances and directions of the distances between the two shaft centerlines as projected in two transverse planes, both the offset misalignment component and the angular misalignment component may be calculated.

Another method which is sometimes employed is known as the face-and-rim method. The "rim" part of this method is measurement of a relative displacement in a radial direction as just described, and the "face" part of this method is measurement of a relative displacement in an axial direction, again at each of the predetermined angular positions which lie in geometric planes in which either of the machines connected to the shafts may be moved in order to achieve an aligned condition. Typically, but not necessarily, the "face" and "rim" measurements are taken generally in the same transverse plane along the shaft axes. While the face-and-rim method thus directly measures angular misalignment, it nevertheless is generally considered to be less accurate than the reverse indicator method.

The techniques of the present invention are applicable to either the reverse indicator method or the face-and-rim method, as well as the other related methods where relative displacement measurements are made at a plurality of angular positions, and are then used in subsequent calculations, particularly to determine machine moves for alignment purposes.

SUMMARY OF THE INVENTION

It is an object of the invention to provide methods and systems for more accurately acquiring offset data for aligning co-rotatable in-line machine shafts.

Briefly, in accordance with the invention, it is recognized that offset data from each measurement device collected as described briefly above during one revolution of the shafts has the form of a sine function, where offset magnitude is a function of shaft angular position. As is known, when a sine function is plotted in a Cartesian coordinate system, the result is what is known as a sine wave. When plotted in a polar coordinate system, the result is a circle.

In accordance with one overall aspect of the invention, data for each of the offsets is collected at a plurality of arbitrary measurement angular positions, which are not necessarily, and likely are not, the 0°, 90°, 180° and 270° angular positions at which measurements are traditionally taken. A respective sine function for each of the offsets is then fitted to the measured data, and data for the traditional 0°, 90°, 180° and 270° positions are determined from the sine function in an indirect predictive manner, rather than by direct measurement at these positions. Advantageously, actual measurement data may be taken at as few as three angular positions of the shafts. Preferably, however, measurement data is taken at more than three angular positions, and typically is taken at a multiplicity of angular positions, perhaps thirty or forty. This has the effect of reducing the overall error which may be caused by an error in an individual reading.

There are thus two different sets of data. An initial set of data results from actual measurement at arbitrary angular positions, at least three in number. This initial data is also referred to herein as measured offset data. A subsequent set of data is determined from the sine functions, for example based on the sine function values at the predetermined 0°, 90°, 180° and 270° angular positions. This subsequent data is also referred to herein as calculation offset data, because it is employed in later calculations to determine actual machine moves to bring the shafts into alignment.

Another overall aspect of the present invention is the collection of measured offset data during continuous rotation of the shafts in their normal direction of rotation. An acceptable alternative is to smoothly rotate the shafts, momentarily pausing the shaft rotation at any arbitrary angular position to take a reading, but avoiding any counter-rotation forces. In the traditional method, where the shafts are rotated and stopped at each of the four angular positions, the shaft position is often adjusted back and forth to achieve the desired angular position as accurately as possible. A number of factors can induce error, such as torsional play in the coupling. There is no guarantee that a coupling will be engaged in the same manner each time shaft position is adjusted to the desired angle. This error can be on the order of several mils, adding time and effort to the alignment process. In addition, collecting data in the normal direction of rotation, avoiding any counter-rotation, more closely approximates the conditions present during equipment operation.

In a more particular aspect, the invention provides a method for developing a pair of data sets respectively indicative of a pair of offsets at each of a plurality of predetermined calculation angular positions of first and second co-rotatable in-line shafts. The predetermined calculation angular positions advantageously lie in geometric planes in which either of first and second machines connected to the first and second shafts may be moved in order to achieve an aligned condition. Typically, the predetermined calculation angular positions are 0°, 90°, 180° and 270°. In one embodiment, the offsets are radial offsets, and the offset data comprises relative displacement in a radial direction between a reference point referenced to one of the shafts and a particular point on the other of the shafts at given angular positions. Alternatively, in an implementation of the face-and-rim method, one of the offsets may be a radial offset and the other an axial offset.

An initial step in the method comprises employing at least one measurement device to acquire measured offset data for each of the pair of offsets at each of at least three measurement angular positions of the shaft. Preferably, two measurement devices are employed to simultaneously acquire measured offset data. The measurement angular positions may be the same for each of the pair of offsets, which is facilitated by employing the two measurement devices simultaneously, but this is not necessary, since the data sets are fit independently. Although measured offset data is acquired at each of at least three measurement angular positions of the shafts, preferably measured offset data for each of the pair of offsets is acquired at each of a plurality greater than three measurement angular positions of the shafts.

Preferably, measured offset data is collected as the shafts are turned in their normal direction of rotation in a manner such that no counter-rotation occurs, even if shaft rotation is paused to collect data. It will be appreciated that, since measured data is collected at arbitrary angular positions, there is no need to adjust the shafts to achieve a particular shaft angular position. Where a data acquisition system permits, data may be collected during continuous rotation of the shafts, again in their normal direction of rotation.

Where the offsets are radial offsets, the measured offset data comprises relative displacement in a radial direction between a reference point referenced to one of the shafts and a particular point on the other of the shafts at a series of angular positions corresponding to the measurement angular positions.

The method continues with the step of fitting a respective pair of sine functions for each of the pair of offsets to the measured offset data, the sine functions each being a function of shaft angular position.

A pair of calculation offset data sets are then determined from the sine functions based on the respective values of the pair of sine functions at each of the predetermined calculation angular positions. The calculation offset data sets may be viewed as predicted data sets, since they represent values which presumably would be found by traditional direct measurement at the 0°, 90°, 180° and 270° angular positions.

In accordance with another more particular aspect of the invention, there is provided a system for aligning first and second co-rotatable in-line shafts connected respectively to first and second machines. The system comprises an alignment fixture having first and second fixture elements respectively mountable to the first and second shafts. The alignment fixture includes a pair of displacement transducers for measuring a respective pair of offsets, and producing respective offset data signals. The alignment fixture additionally includes an angular transducer for measuring angular position of the shafts and producing an angular position data signal.

The system also includes an alignment calculator, and a data link for transmitting the data signals from the transducers to the alignment calculator. The data link may comprise either a conventional cable, or a wireless link such as a radio link or an optical data link.

The alignment calculator includes elements which serve to record measured offset data based on offset data signals from each of the pair of displacement transducers at each of at least three measurement angular positions as determined from the angular position data signal, to fit a respective pair of sine functions as a function of shaft angular position to the measured offset data for the pair of offsets, and to determine a pair of calculation offset data sets based on respective values at each of a plurality of predetermined calculation positions. Elements within the alignment calculator additionally employ the calculation offset data sets to generate instructions for moving at least one of the machines to improve alignment of the shafts.

In a more particular embodiment, one of the displacement transducers measures a system wherein one of the displacement transducers measures relative displacement in a radial direction between a reference point referenced to one of the shafts and a particular point on the other of the shafts, and the other of the displacement transducers measures relative displacement in a radial direction between a reference point referenced to the other of the shafts and a particular point on the one shaft.

As discussed above, the predetermined calculation angular positions lie in geometric planes in which either of the machines may be moved in order to achieve an aligned condition, and these predetermined calculation angular positions are typically 0°, 90°, 180° and 270°.

It will be appreciated that the term "shaft" employed herein includes, in addition to the shafts per se, various attached elements such as coupling hubs and flanges. Although the methods of the invention are preferably implemented in an automatic system, it will be appreciated that readings may be taken manually, for example employing conventional dial indicators and an angular position gauge, and manually entered into a suitably programmed calculator.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description, taken in conjunction with the drawings, in which:

DETAILED DESCRIPTION

Figure 1:
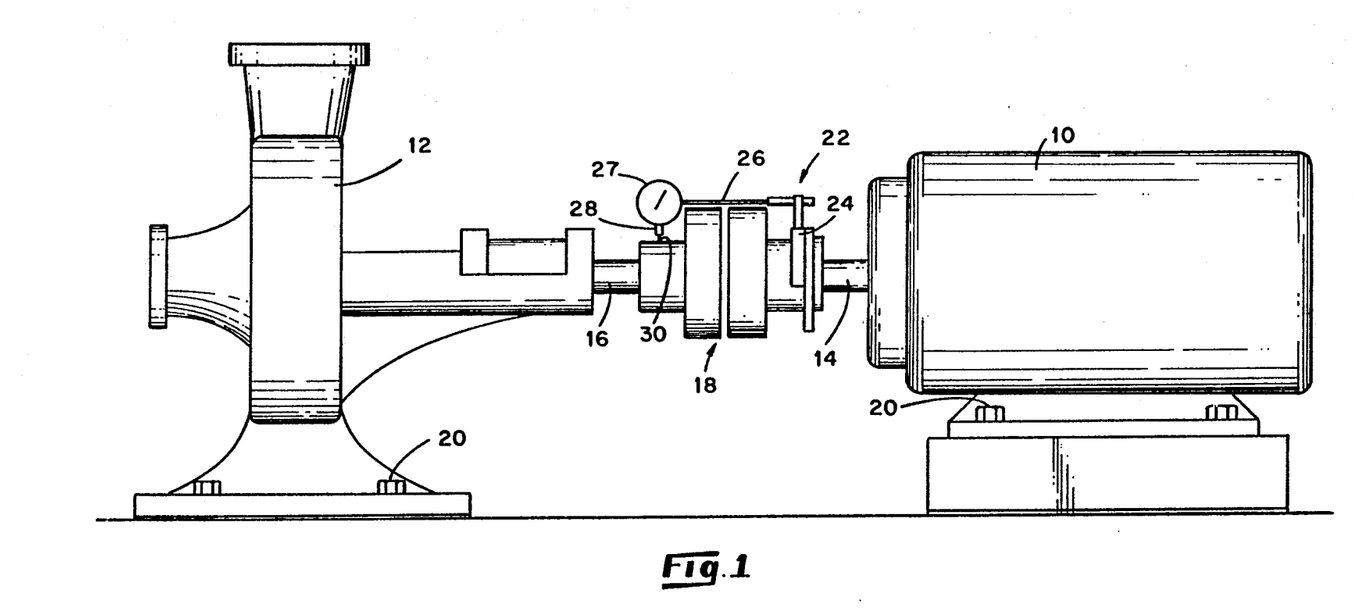
FIG. 1 depicts in overview the general environment of first and second co-rotatable in-line shafts connected respectively to first and second machines, with a dial indicator type alignment fixture spanning the coupling for measuring relative displacement at various angular positions.

Referring initially to FIG. 1, first and second rotating machines 10 and 12, in the representative form of a motor 10 driving a pump 12, have respective first and second in-line shafts 14 and 16 connected to each other by means of a coupling 18. The machines 10 and 12 are secured to a floor or other underlying support by means of bolts 20. As is well known, for alignment purposes, the bolts 20 can be loosened, and either or both of the machines, typically the motor 10, can be moved in horizontal and vertical planes in order to achieve alignment between the two shafts 14 and 16 within predetermined tolerances. Although not shown in FIG. 1, shims are usually employed to selectively raise and lower mounting points for the machines 10 and 12 during a alignment procedure.

Also shown in FIG. 1 is a typical alignment fixture 22, comprising a base 24 fixed to the first shaft 14, an extension bar 26 extending generally parallel to the shafts 14 and 16 over the coupling 18, and a dial indicator 27 having a plunger 28 contacting the periphery of a portion of the second shaft 16 at a point 30, which portion happens to be a hub of the coupling 18. It will be appreciated that the base 24 and extension bar 26 together serve to define a reference point over the point 30 on the second shaft 16, which reference point is referenced to the first shaft 14. As the shafts 14 and 16 are rotated together, relative displacement in a radial direction (radial offset) between the reference point and the point 30 on the shaft 16 is measured at various angular positions, to thus collect a set offset data. This offset data directly reflects distance and direction of the distance between the extended centerlines of the two shafts 14 and 16 in the transverse plane containing the measurement point.

In accordance with the reverse indicator alignment method, in order to have sufficient data for determining alignment moves, a second set of offset data must be collected in another transverse plane, in addition to the transverse plane containing the point 30. Although such data could be taken by extending the extension bar 26, conveniently the second set of data is taken by an alignment fixture extending in the opposite direction, that is, fixed to the second shaft 16 and extending laterally to a reference point over a point on the first shaft 14. Either a single alignment fixture 22 may be employed, and moved from one side to the other, or a pair of alignment fixtures may be employed for simultaneous readings. When a pair of alignment fixtures 22 are employed, they often are positioned on opposite sides of the shafts, that is, 180° apart for "out of phase" readings. However, they may also be positioned immediately adjacent each other for "in phase" readings, and this "in phase" orientation is preferred in the practice of the present invention.

Although the alignment fixturing in FIG. 1 is for the reverse indicator method, the invention is not limited to this particular method, and various forms of the face-and-rim method may be employed wherein one offset is a radial offset, and the other is an axial offset. Analysis procedures for a number of specific methods are well developed.

It should be noted that another relevant factor is known as "sag", which is a result of beam deflection of the extension bar 26 under force of gravity. To achieve an accurate alignment, sag is a factor which must be independently measured and taken into account in making calculations, as is well known in the art. One method of determining sag is disclosed in commonly-assigned related application Ser. No. 07/893,102 filed Jun. 3, 1992 concurrently herewith by Kenneth R. Piety and Daniel L. Nower entitled "Alignment Bracket Assembly Integrity Check and Sag Determination."

Figure 2:
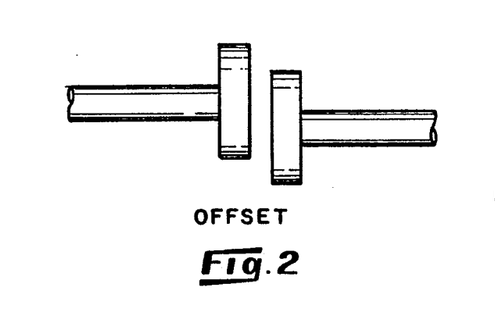
FIG. 2 depicts offset misalignment.
Figure 3:
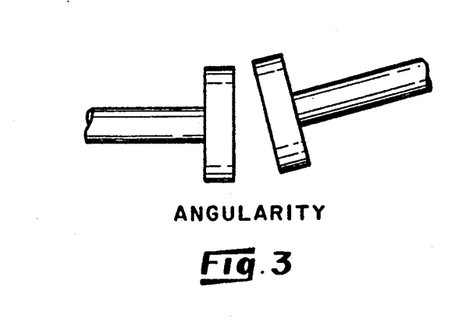
FIG. 3 depicts angular misalignment.

FIG. 2 illustrates the misalignment component alternatively known as offset misalignment, offset, or parallel misalignment. FIG. 3 illustrates the misalignment component alternatively known as angular misalignment or angularity. Either or both of these misalignments may be present in a given situation, and they may exist in any plane. In most situations, the misalignment can be corrected by proper moves of one of the machines in vertical and horizontal planes, including the use of shims to raise and lower individual mounting feet of a particular machine.

Figure 4:
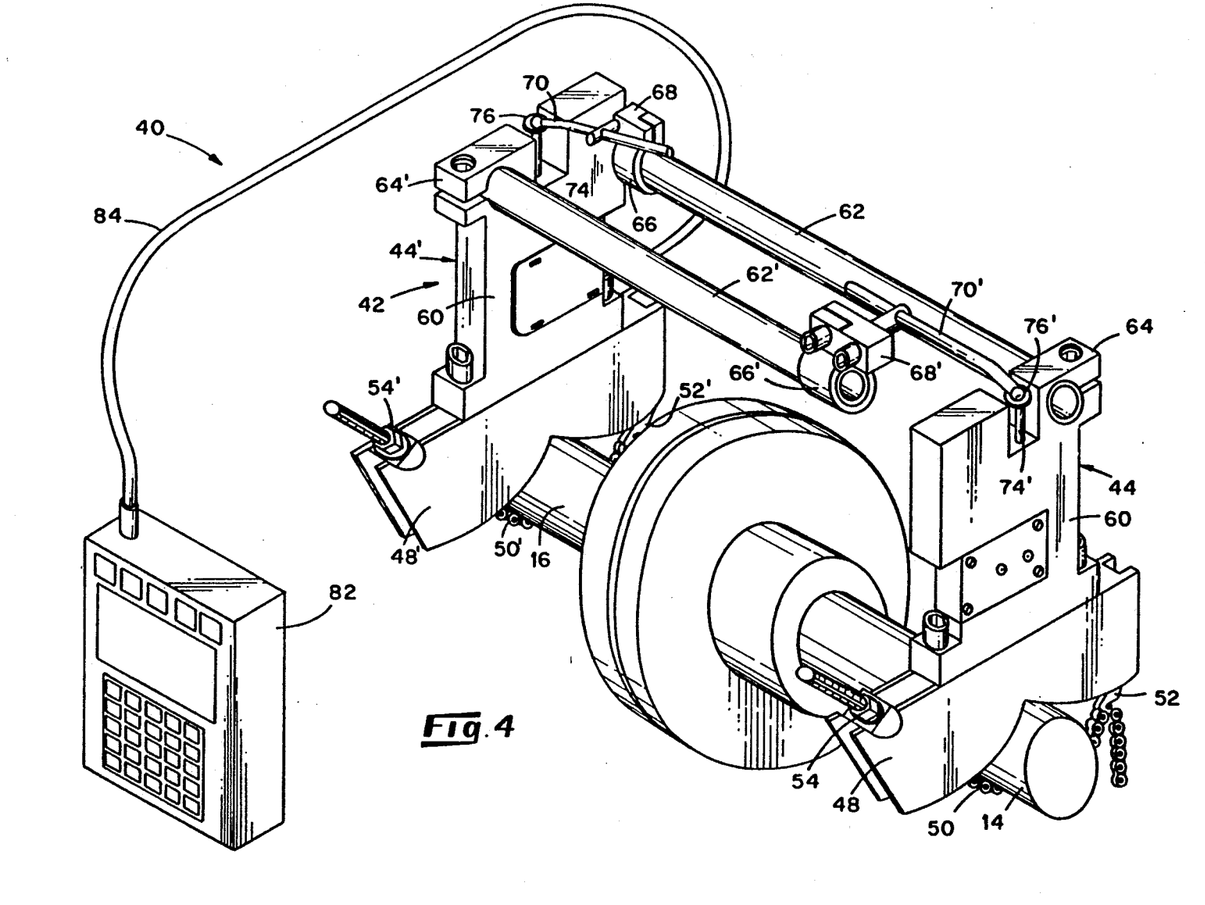
FIG. 4 is a three-dimensional view of a system for aligning first and second co-rotatable in-line shafts.
Figure 5:
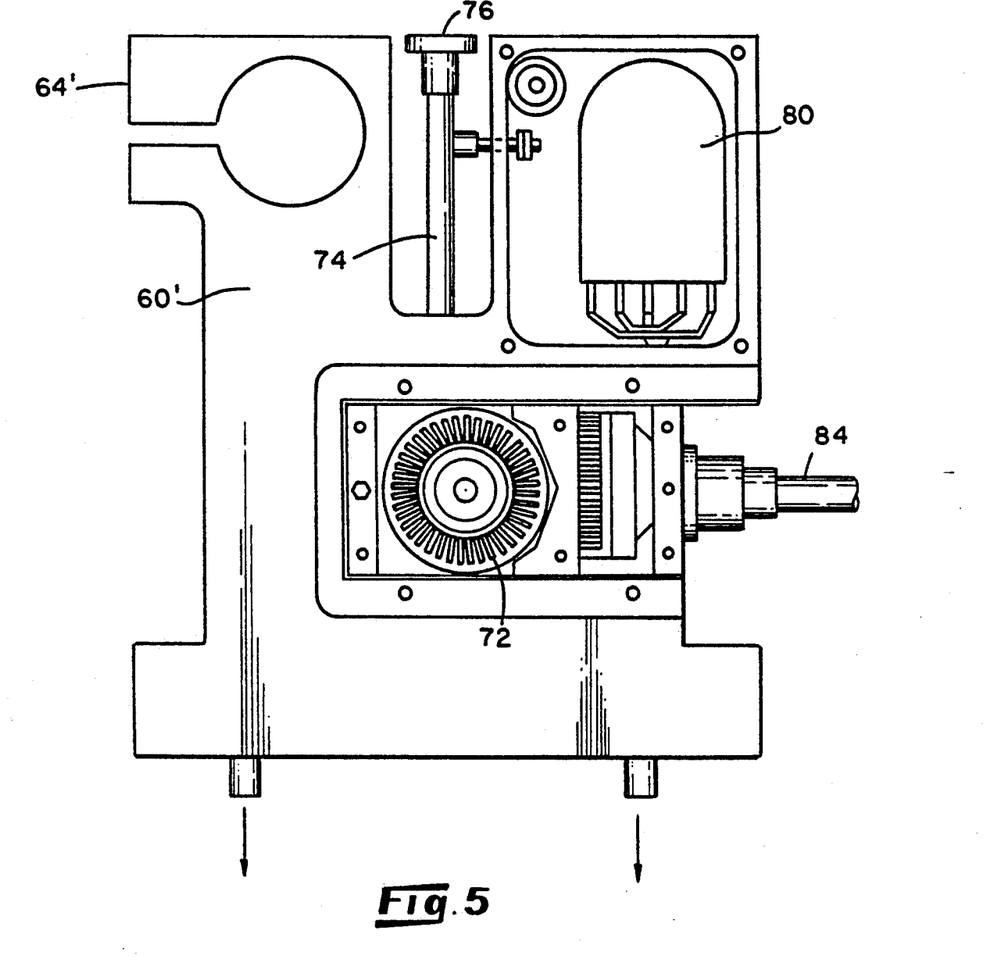
FIG. 5 is a side elevational view showing details of one of the sensor heads of the FIG. 4 system.

Referring now to FIGS. 4 and 5, shown in greater detail is a system 40 in accordance with the invention for aligning the first and second co-rotatable in-line shafts 14 and 16 connected respectively to the first and second machines 10 and 12. In FIG. 4, an alignment fixture 42 has first and second fixture elements 44 and 44' respectively mountable to the first and second shafts 14 and 16. In particular, the first fixture element 44 comprises a suitably configured mounting block 48 secured to the shaft 14 by means of a chain 50 and swing link 52 adjustably connected to one end of the chain, and a tightening device 54 connected to the other end of the chain 50. The second fixture element 44' correspondingly comprises a suitably configured mounting block 48', a chain 50', a swing link 52' and a chain tightening device 54'.

Attached to the mounting blocks 48 and 48' are respective sensor heads 60 and 60'. Although not depicted in FIG. 4, spacer blocks may be employed between the sensor heads 60 and 60' and the mounting blocks 48 and 48' in order to provide clearance around a large coupling 18. Such spacer blocks (not shown) may be provided as a set of different height spacer blocks for selective use to adopt the fixture 42 to various coupling situations.

The particular fixture 42 depicted in FIG. 4 measures a pair of radial offsets at each of a plurality of measurement angular positions as the shafts 14 and 16 are rotated together. Thus, a first extension bar 62 is firmly affixed to the first sensor head 60 by means of an extension bar clamp 64, and the first extension bar 62 extends over the coupling 18, generally parallel to the shafts 14 and 16, to a point over the second shaft 16. Secured to the distal end 66 of the extension bar 62 by an adjustable attachment element 68 is an adjustable tip element 70, the end of which is fixedly referenced, neglecting sag, to the first shaft 14. The tip element 70 thus defines a reference point referenced to the first shaft 14, and is positioned over a particular point on the second shaft 16. The extension bar clamp 64 and the attachment 68 for the tip element 70 are adjustable to adopt the fixture 42 to various coupling situations.

Within the second sensor head 60', and as shown in greater detail in FIG. 5, is a displacement transducer 72 having a connecting rod 74 terminating in a transducer tip 76 which engages the extension bar tip element 70. The connecting rod 74 of the displacement transducer 72 is lightly spring loaded such that the extension bar tip element 70 and the displacement transducer tip 76 are in contact at all times during a measurement operation, and the transducer tip 76 and connecting rod 74 translate as the distance between the extension bar tip element 70 and the second shaft 16 varies in a redial direction during rotation of the shafts 14 and 16.

Firmly affixed to the second sensor head 60' is a second extension bar 62'. The second sensor head 60' and second extension bar 62' are essentially identical to the first sensor head 60 and first extension bar 62, but in the opposite orientation. Elements associated with the second extension bar 62' and corresponding with like elements of the first extension bar 62 as described hereinabove include a second extension bar clamp 64', a distal end 66', an adjustable attachment element 68', and an adjustable tip element 70' which defines a reference point referenced to the second shaft 16 and positioned over a particular point on the first shaft 14. Although not visible in FIGS. 4 and 5, it will be appreciated that, within the first sensor head 44, is a displacement transducer like the displacement transducer 72 having a connecting rod 74' (partially visible in FIG. 4) terminating in a second transducer tip 76'. The second transducer tip 76' engages the adjustable tip element 70', and the transducer tip 76' and connecting rod 74' translate as the distance between the second extension bar tip element 70' and the first shaft 14 varies in a radial direction during rotation of the shafts 14 and 16.

The system 40 additionally includes an angular position transducer 80 (FIG. 5) for measuring angular position of the shafts 14 and 16 for alignment purposes. The angular position transducer 80 produces an angular position data signal.

While mechanical transducers 72 and 72' are employed for producing the measured offset data, it will be appreciated that optical or other forms of transducer may be employed, for example employing a beam of laser light.

Another element of the system 40 is an alignment calculator 82 and a representative data link 84 for transmitting data signals from the transducers 72, 72' and 80 to the alignment calculator 82. In FIG. 4, the data link 84 comprises a conventional wire cable. However, various forms of wireless data links may be employed, using radio or optical signals to transmit the data. Wireless data links have the advantage that the shafts 14 and 16 may be freely rotated for any number of revolutions without entangling the cable 84. (However, this is not necessarily a practical disadvantage even with a cable 84.)

The alignment calculator 82 is microprocessor based and includes suitable conventional elements which serve to record measured offset data signals based on offset data signals from the displacement transducers 72 and 72' at each of at least three measurement angular positions as determined from the angular position data signal from the transducer 80. Elements within the alignment calculator 82 additionally serve to fit a respective pair of sine functions as a function of shaft angular position to the measured offset data for the pair of offsets, as is described in greater detail hereinbelow with reference to FIGS. 6A and 6B. Elements within the alignment calculator 82 also serve to determine, from the sine functions, a pair of calculation offset data sets based on respective values of the sine functions at each of a plurality of predetermined calculation angular positions. Finally, elements within the alignment calculator 82 employ the calculation offset data sets to generate instructions for moving at least one of the machines 10 and 12 to improve alignment of the shafts 14 and 16.

Figure 6A:
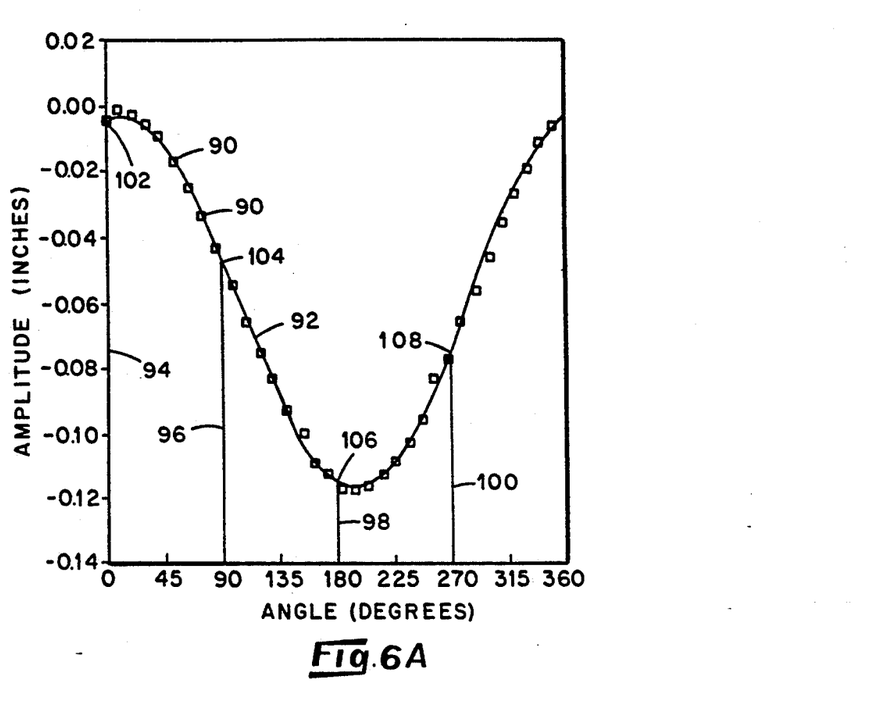
FIGS. 6A and 6B are plots in a Cartesian coordinate system of respective measured data sets acquired at a plurality of measurement angular positions and respective fitted sine functions for the offset data sets.
Figure 6B:
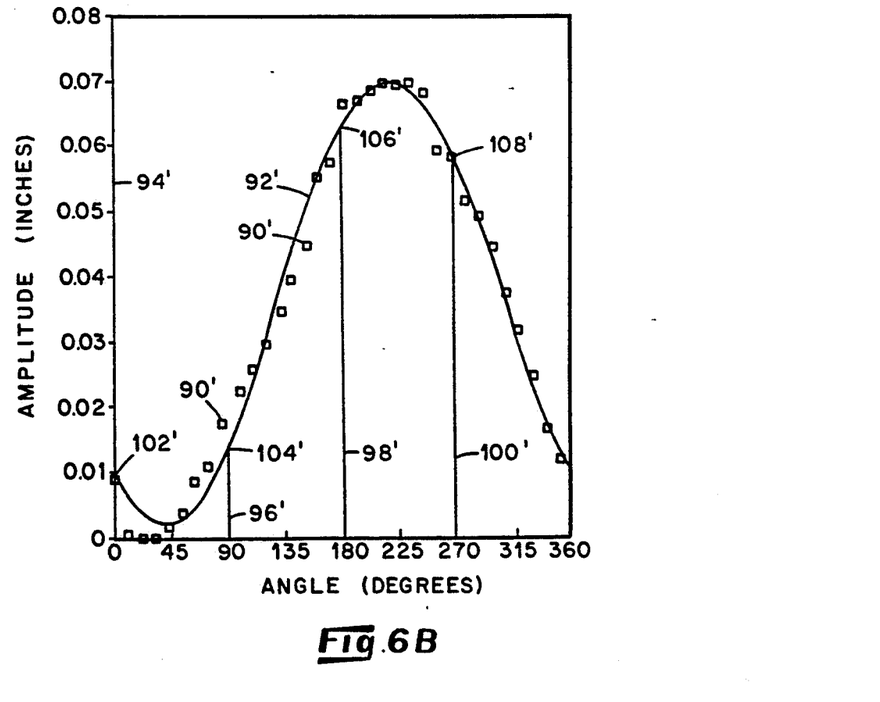

FIG. 6A is a plot, in a Cartesian coordinate system, of measured offset data points 90 based on data from the displacement transducer 72, and FIG. 6B is a corresponding plot of measured offset data points 90' based on data from the other displacement transducer, both as a function of angular position as determined by the angular position transducer 80. The data points 90 and 90' are taken at a plurality of arbitrary angular positions, approximately every 10°. The particular data represented in FIGS. 6A and 6B were taken by two in-phase sensors at a misaligned condition characterized as a combination of thirty mils offset misalignment with three mils/inch of angular misalignment.

Although the data points 90 and 90' of FIGS. 6A and 6B were taken at the same angular positions, such is not necessary in the practice of the invention. As mentioned hereinabove, in the practice of the method of the invention, it is preferable to acquire the measured offset data during continuous rotation of the shafts 14 and 16 in their normal direction of rotation. Nevertheless, the invention may be practiced by manually acquiring and recording the data points 90 and 90', using conventional dial indicators.

Respective sine functions represented as sine wave curves 92 and 92' are fitted to the sets 90 and 90' of data points. In the Cartesian coordinate system plots of FIGS. 6A and 6B, the curves 92 and 92' appear as sine waves, as noted. If a polar coordinate system were employed, the curves 92 and 92' would be circles, with the points 90 and 90' lying generally on such circles.

In a Cartesian coordinate system, the equation for a sine wave is $y = B + A \sin(\theta + \phi)$, where $\theta$ is the angle from 0° to 360°, A is the peak amplitude, $\phi$ is the constant phase offset of the sine wave, and B is the constant offset for the amplitude of the curve. The values of B, A and $\phi$ thus define a particular sine wave.

Various known techniques can be used for fitting the sine functions to the data, and the present invention does not require any particular method. By way of example, a least square technique may be employed. As another example, phase offset could be estimated by locating the zero crossing and peak values, and estimating the peak amplitude by calculating the power integral of the area under the curve. If a partial revolution of the shafts 14 and 16 is all that can be achieved, then a non-linear, iterative least square fit to the data may be employed.

In FIGS. 6A and 6B, it is evident that the data points 90 and 90' do not all lie exactly on the plotted sine curves 92 and 92'. These deviations from a perfect sine wave are caused by the various error sources mentioned hereinabove, such as torsional play in the coupling. By employing multiple sample points, overall errors are greatly reduced because a single erroneous reading, for example, has far less influence on the overall result. Field engineers applying traditional techniques often report that the four measured values do not follow the expected theoretical relationship.

At the same time, it will be appreciated that the present invention, which involves fitting a sine function to data points, can be employed where only three sampled data points for each of the two offsets are available, because mathematically a sine function can be fit to three data points. Since the measurement angular positions can be the same for each of the pair of measured offsets, three measurement positions are all that are required to implement the method.

After the sine functions represented by the curves 92 and 92' of FIGS. 6A and 6B are developed, the values of the functions at the predetermined calculation angular positions are determined. As explained hereinabove, the predetermined calculation angular positions preferably lie in geometric planes in which either of the machines 10 and 12 connected to the shafts 14 and 16 may be moved. These planes of movement are typically horizontal and vertical planes, and the predetermined calculation angular positions are thus traditionally 0°, 90°, 180° and 270°.

In FIGS. 6A and 6B, vertical lines 94, 96, 98 and 100 and 94', 96', 98' and 100' are drawn at the 0°, 90°, 180° and 270° angular positions, intersecting the curves 92 and 92' at points 102, 104, 106 and 108, and 102', 104', 106' and 108'. The four values of each of the calculation offset data sets are thus determined at the intersection points 102, 104, 106 and 108, and 102', 104', 106' and 108' as the function values at these points. The calculation offset data sets may also be viewed as predicted values, since they represent values which would presumably be determined by traditional direct measurement at the 0°, 90°, 180° and 270° angular positions, but more accurately.

By way of example, the following tables present the results of analysis of the data of FIGS. 6A and 6B, taking into account also the measurement of sag as is well-documented in the art and described in greater detail in the above-identified concurrently-filed application Ser. No. 07/893,102.

| DATA ANALYSIS FOR FIG. 6A | |
|---|---|
| SAG: | 0.0010 |
| FITTED PARAMETERS: | |
| OFFS: | −0.0604 |
| AMPL: | 0.0571 |
| PHAS: | 75.46 |
| % ERR: | 3 |
| PREDICTED VALUES: | |
| 0: | −0.0051 |
| 90: | −0.0461 |
| 180: | −0.1157 |
| 270: | −0.0748 |
| SAG ADDED BACK: | |
| 0: | −0.0046 |
| 90: | −0.0461 |
| 180: | −0.1162 |
| 270: | 0.0748 |
| DATA ANALYSIS FOR FIG. 6B | |
| SAG: | 0.0010 |
| FITTED PARAMETERS: | |
| OFFS: | 0.0357 |
| AMPL: | 0.0336 |
| PHAS: | 230.76 |
| % ERR: | 8 |
| PREDICTED VALUES: | |
| 0: | 0.0096 |
| 90: | 0.0144 |
| 180: | 0.0617 |
| 270: | 0.0570 |
| SAG ADDED BACK: | |
| 0: | 0.0101 |
| 90: | 0.0144 |
| 180: | 0.0612 |
| 270: | 0.0570 |

In the above "Data Analysis" charts, and with reference to the sine wave equation $y = B + A \sin(\theta + \phi)$, "OFFS" corresponds to B, "AMPL" corresponds to A, and "PHAS" corresponds to $\phi$. "%ERR" indicates how closely the actual data points fit a sine wave.

Given the data thus determined or predicted for the 0°, 90°, 180° and 270° angular positions, calculation of the required machine moves for alignment proceeds in a conventional manner as is well known in the art.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method for developing a pair of data sets respectively indicative of a pair of offsets at each of a plurality of predetermined calculation angular positions of first and second co-rotatable in-line shafts, said method comprising the steps of:

employing at least one measurement device to acquire measured offset data for each of the pair of offsets at each of at least three measurement angular positions of the shafts;

fitting a respective pair of sine functions as a function of shaft angular position to the measured offset data for each of the pair of offsets; and determining a pair of calculation offset data sets based on the respective values of the pair of sine functions at each of the predetermined calculation angular positions.

2. A method in accordance with claim 1, wherein the predetermined calculation angular positions lie in geometric planes in which either of first and second machines connected to the first and second shafts may be moved.

3. A method in accordance with claim 2, wherein the predetermined calculation angular positions are 0°, 90°, 180° and 270°.

4. A method in accordance with claim 1, wherein the measurement angular positions are the same for each of the pair of offsets.

5. A method in accordance with claim 1, which comprises employing at least one measurement device to acquire measured offset data for each of the pair of offsets at each of a plurality greater than three measurement angular positions of the shafts.

6. A method in accordance with claim 1, wherein the step of employing at least one measurement device to acquire measured offset data comprises rotating the shafts in their normal direction of rotation, and avoiding counter-rotation forces.

7. A method in accordance with claim 1, wherein the step of employing at least one measurement device to acquire measured offset data comprises collecting data during continuous rotation of the shafts in their normal direction of rotation.

8. A method in accordance with claim 1, which comprises employing two measurement devices simultaneously to acquire measured offset data.

9. A method in accordance with claim 8, wherein the offsets are radial offsets and the measured offset data comprises relative displacement in a radial direction between a reference point referenced to one of the shafts and a particular point on the other of the shafts at a series of angular positions corresponding to the measurement angular positions.

10. A method for developing a pair of data sets respectively indicative of a pair of offsets at each of a plurality of predetermined calculation angular positions of first and second co-rotatable in-line shafts, said method comprising the steps of:

employing at least one measurement device to acquire measured offset data for each of the pair of offsets at each of at least three measurement angular positions of the shafts, rotating the shafts in their normal direction of rotation between measurement angular positions;

fitting a respective pair of sine functions as a function of shaft angular position to the measured offset data for each of the pair of offsets; and determining a pair of calculation offset data sets based on the respective values of the pair of sine functions at each of the predetermined calculation angular positions.

11. A method in accordance with claim 10, wherein the step of employing at least one measurement device to acquire measured offset data comprises acquiring measured offset data during continuous rotation of the shafts in their normal direction of rotation.

12. A system for aligning first and second co-rotatable in-line shafts connected respectively to first and second machines, said system comprising:

an alignment fixture having first and second fixture elements respectively mountable to said first and second shafts, said alignment fixture including a pair of displacement transducers for measuring a respective pair of offsets and producing respective offset data signals, and said alignment fixture including an angular transducer for measuring angular position of said shafts and producing an angular position data signal;

an alignment calculator;

a data link for transmitting the data signals from said transducers to said alignment calculator;

said alignment calculator including elements which record measured offset data based on offset data signals from each of said pair of displacement transducers at each of at least three measurement angular positions as determined from the angular position data signal, fit a respective pair of sine functions as a function of shaft angular position to the measured offset data for the pair of offsets, and determine a pair of calculation offset data sets based on respective values of the sine functions at each of a plurality of predetermined calculation angular positions.

13. A system in accordance with claim 12, wherein elements included within said alignment calculator employ the calculation offset data sets to generate instructions for moving at least one of the machines to improve alignment of the shafts.

14. A system in accordance with claim 12, wherein one of said displacement transducers measures relative displacement in a radial direction between a reference point referenced to one of the shafts and a particular point on the other of the shafts, and the other of said displacement transducers measures relative displacement in a radial direction between a reference point reference to the other of the shafts and a particular point on the one shaft.

15. A system in accordance with claim 12, wherein the predetermined calculation angular positions lie in geometric planes in which either of the machines may be moved in order to achieve an aligned condition.

16. A system in accordance with claim 15, wherein the predetermined calculation angular positions are 0°, 90°, 180° and 270°.

17. A system in accordance with claim 13, wherein the predetermined calculation angular positions lie in geometric planes in which either of the machines may be move in order to achieve an aligned condition.

18. A system in accordance with claim 17, wherein the predetermined calculation angular positions are 0°, 90°, 180° and 270°.

* * * * *